(12) United States Patent
Christensen et al.

(10) Patent No.: US 12,406,119 B2
(45) Date of Patent: Sep. 2, 2025

(54) PROCESSOR CHIP TIMING ADJUSTMENT ENHANCEMENT

(71) Applicant: INTERNATIONAL BUSINESS MACHINES CORPORATION, Armonk, NY (US)

(72) Inventors: Todd A. Christensen, Rochester, MN (US); John E. Sheets, II, Zumbrota, MN (US); Eric Marz, Williston, VT (US); Kirk D. Peterson, Jericho, VT (US)

(73) Assignee: International Business Machines Corporation, Armonk, NY (US)

( * ) Notice: Subject to any disclaimer, the term of this patent is extended or adjusted under 35 U.S.C. 154(b) by 758 days.

(21) Appl. No.: 17/541,797

(22) Filed: Dec. 3, 2021

(65) Prior Publication Data

US 2023/0177243 A1 Jun. 8, 2023

(51) Int. Cl.
*G06F 30/3312* (2020.01)
*G06F 30/3323* (2020.01)
*G06F 30/398* (2020.01)

(52) U.S. Cl.
CPC ...... *G06F 30/3312* (2020.01); *G06F 30/3323* (2020.01); *G06F 30/398* (2020.01)

(58) Field of Classification Search
USPC .......................................................... 716/113
See application file for complete search history.

(56) References Cited

U.S. PATENT DOCUMENTS

| | | | |
|---|---|---|---|
| 8,307,317 B2 | 11/2012 | Adams et al. | |
| 8,701,075 B2 | 4/2014 | Dartu et al. | |
| 8,788,995 B1 | 7/2014 | Kumar et al. | |
| 8,875,082 B1 | 10/2014 | Sircar et al. | |
| 9,553,819 B2 | 1/2017 | Schmidt et al. | |
| 9,581,643 B1 | 2/2017 | Schelle et al. | |
| 9,678,150 B2 | 6/2017 | Schelle et al. | |
| 2005/0256921 A1* | 11/2005 | Amekawa | G06F 30/367 708/800 |
| 2011/0289465 A1* | 11/2011 | Adams | G06F 30/3312 716/113 |
| 2012/0210286 A1* | 8/2012 | Abdelhamid | G06F 30/327 716/113 |
| 2013/0227507 A1* | 8/2013 | Dartu | G06F 30/3315 716/108 |
| 2016/0092787 A1* | 3/2016 | Gadde | G06N 5/02 706/12 |
| 2017/0115348 A1* | 4/2017 | Schelle | G01R 31/3177 |

(Continued)

OTHER PUBLICATIONS

Bhasker et al., Static Timing Analysis for Nanometer Designs: a Practical Approach, Springer Science & Business Media, URL: https://play.google.com/store/books/details?pcampaignid=books_read_action&id=N1Zn1RdqPVoC, dated Apr. 2009, 3 pages.

(Continued)

*Primary Examiner* — Mohammed Alam
(74) *Attorney, Agent, or Firm* — Onyx IP Group

(57) ABSTRACT

Data relating to one or more circuit paths may be collected during a design stage of a processor chip based on a design model. One or more delta values may be added to the one or more circuit paths of the design model. One or more broken circuit paths may be identified based on the one or more delta values. A target time for each of the one or more broken circuit paths may be adjusted.

20 Claims, 12 Drawing Sheets

(56) References Cited

U.S. PATENT DOCUMENTS

2022/0381848 A1* 12/2022 Ho .................. G01R 31/367
2023/0177243 A1*  6/2023 Christensen ........ G06F 30/3323
                                                        716/113

OTHER PUBLICATIONS

Gil Rahav, STA—Static Timing Analysis, Freescale Semiconductors Israel, URL: http://www.ee.bgu.ac.il/~digivisi/slides/STA_9_1.pdf, printed May 21, 2021, 125 pages.

* cited by examiner

| Path | Timing | Type 1 Logic Gate | Type 1 Logic Gate | Type 1 Logic Gate | Type 2 Logic Gate | Type 2 Logic Gate | Type 2 Logic Gate | Type 3 Logic Gate | M1 RC | M2 RC | Most Affected |
|---|---|---|---|---|---|---|---|---|---|---|---|
| 1 | 117 | 35% | | | | | | | 15% | 15% | |
| 2 | 110 | | 35% | 35% | | | | | 15% | 15% | |
| 3 | 120 | | | | 35% | 35% | 35% | | 15% | 15% | ▨ |
| 4 | 120 | 20% | 20% | 20% | 20% | 20% | 20% | 20% | 15% | 15% | |
| 5 | 120 | 20% | 20% | 20% | | | | | 15% | 15% | |
| 6 | 104 | | | | | | | | 10% | 10% | |
| 7 | 108 | | | | 20% | 20% | | 20% | 10% | 10% | |
| 8 | 94 | | | | | 20% | 20% | 20% | 10% | 10% | ▨ |
| 9 | 122 | | | | | | | | 20% | 40% | ▨ |
| 10 | 115 | | | | | | | | 20% | 40% | ▤ |
| Deltas To Model | | -2% | -2% | -2% | -5% | -2% | +12% | -2% | -2% | +10% | |

PROCESSOR CHIP TIMING ADJUSTMENT ENHANCEMENT

BACKGROUND

Field of the Invention

The field of the invention is data processing, or, more specifically, methods, apparatus, and products for processor chip timing adjustment enhancement for processor chip design models in a computing system using a computing processor.

Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

SUMMARY

According to an embodiment of the present disclosure, a method for improving processor chip timing adjustment in a computing system is provided. Data relating to one or more circuit paths may be collected during a design stage of a processor chip based on a design model. One or more delta values may be added to the one or more circuit paths of the design model. One or more broken circuit paths may be identified based on the one or more delta values. A target time for each of the one or more broken circuit paths may be adjusted.

An embodiment includes a computer usable program product. The computer usable program product includes a computer-readable storage device, and program instructions stored on the storage device.

An embodiment includes a computer system. The computer system includes a processor, a computer-readable memory, and a computer-readable storage device, and program instructions stored on the storage device for execution by the processor via the memory.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

BRIEF DESCRIPTION OF THE DRAWINGS

FIG. 5 depicts a table diagram depicting processor chip timing adjustment enhancements in a computing system in a computing environment in accordance with some embodiments of the present disclosure.

DETAILED DESCRIPTION OF THE DRAWINGS

Figure 1:
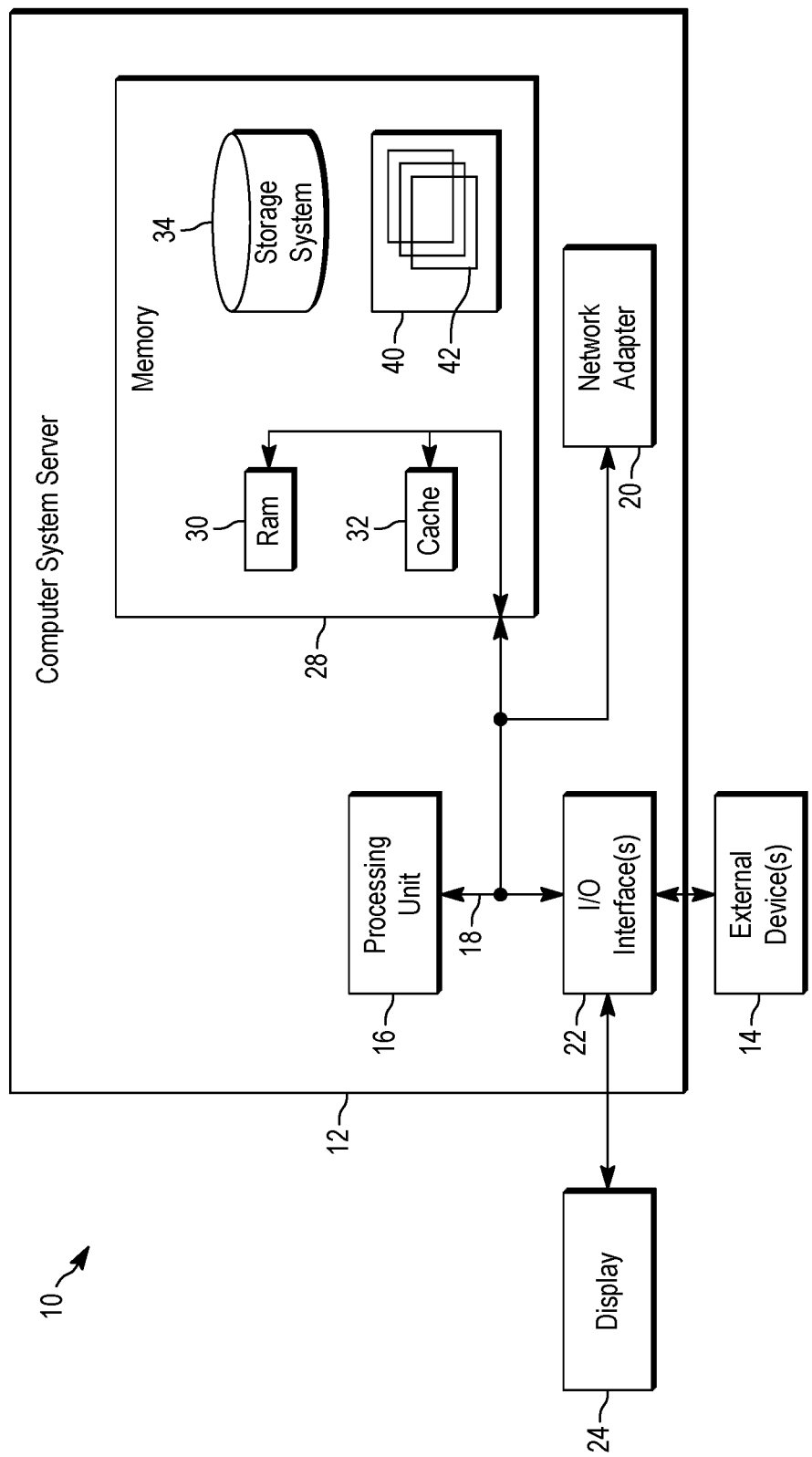
FIG. 1 is a block diagram depicting an exemplary cloud computing node in accordance with some embodiments of the present disclosure.

The present disclosure relates generally to the field of electronic components, and more specifically, to electronic design automation ("EDA") for creating integrated circuit devices and products such as, for example, a system on a chip ("SoC") and improving processor chip timing adjustments.

In general, EDA is a collection of software tools used to both design and analyze integrated circuits. Design flows for chip design include logic synthesis, placement, routing, and analysis. Design flow steps can be performed in order, or some steps may be integrated to efficiently create an optimized circuit design. Logic synthesis is the process of expressing each functional circuit design requirement into a representation of physical logic circuits or gates. The logic circuits are summed up in a netlist for the design. Placement is the process where all components of a netlist are physically placed on a map of the chip area while optimizing wire length, longest path, congestion, and power consumption. Routing is the process where all the placed components are wired together. At this point, a rough physical design is complete, and the design flow proceeds to analysis.

Various operations, simulations, and tools may be used for timing analysis on an integrated circuit design to determine whether a signal arrives at an expected/anticipated time, arrives too early, or arrives too late from the start to the end of each circuit path or "timing path." For example, analysis of circuit designs may include simulation, physical verification, and static timing analysis (STA). Simulation includes methods, such as transistor simulation, logic simulation, or behavioral simulation. Physical verification is the process of determining the manufacturability of an integrated circuit design. Static timing analysis (STA) is a method for computing the timing of a digital circuit design, particularly looking for hold time violations and setup time violations. An early mode or "hold time violation" occurs when data arrives too early to be properly latched into a storage element. A late mode or "setup time violation" occurs when data arrives too late. Based on the timing analysis, extra delay books, delay inverters or buffers are added to the digital circuit design to slow down signals that arrive too early. Delay books or delay inverters take up valuable area in the chip design which may already be congested. Thus, both hold times and setup times should be satisfied for the circuit path or "timing path" to propagate a signal in the circuit path (e.g., propagate a correct or expected output signal).

Moreover, custom processor chips tend to have design releases while the technology and device models are still immature. New processor chip design models are delivered closer to the release with little or no reaction time available. Redoing the entire processor chip timing flow once a new model is delivered from the fabrication facility, including, installing, re-extracting, new timing rule generation and retiming the chip may take a significant length of time.

Thus, various embodiments as described herein provide for saving data (e.g., the meta data) about each contributing component (e.g., the physical logic circuits or gates) for each path of a circuit during the processor chip timing analysis. Subsequently, one or more errors of a circuit path of the design model may be determined and/or calculated and the metadata can be mined, extracted, and analyzed for each of the paths. A critical path and the timing flow of the path may be identified and selectively target to adjust the path to improve the timing flow of the path. In this way, adjustments to one or more sections or components of the targeted path enable enhanced timing adjustments without adjusting or redoing an entire circuit design and timing flow. In one embodiment, to further enhance and speed up the timing analysis operation, the meta data of the circuit paths may be reduced or pruned to a smaller subset of metadata that only contains paths having a defined timing slack or a range of time slack values.

Accordingly, an embodiment is directed to a method of improving processor chip timing adjustment in a computing system. The method includes collecting data relating to one or more circuit paths during a design stage of a processor chip based on a design model. The method includes adding one or more delta values to the one or more circuit paths of the design model. The method includes identifying one or more broken circuit paths based on the one or more delta values. The method includes adjusting a target time for each of the one or more broken circuit paths. In some embodiments, timing slack may be the difference between actual or achieved time and a target time (e.g., goal time) for a timing path of a circuit.

In some implementations, the method also includes saving metadata relating to each component contributing to the one or more circuit paths. In some implementations, the method also includes identifying a critical path of the one or more circuit paths based on the collected data. In some implementations, the method also includes identifying one or more near critical paths of the one or more circuit paths using a machine learning operation, where a near critical path is a path having one or more features, characteristic, attributes, timing flow, or shared components with the critical path.

In some implementations, the method also includes collecting feedback of the one or more circuit paths based on the collected data and the adjusted target times for each of the one or more broken circuit paths. In some implementations, the method also includes adjusting one or more design parameters of the design model based on the collected feedback. In some implementations, the method also includes predicting a minimum voltage and timing sequences for each component contributing to the one or more circuit paths based on the collected data.

Another embodiment is directed to a system for improving processor chip timing adjustment in a computing system. The system comprises a computer processor, a computer memory operatively coupled to the computer processor, the computer memory having disposed therein computer program instructions that, when executed by the computer processor, cause the system to collect data relating to one or more circuit paths during a design stage of a processor chip based on a design model. The computer program instructions also, when executed, cause the system to add one or more delta values to the one or more circuit paths of the design model. The computer program instructions also, when executed, cause the system to identify one or more broken circuit paths based on the one or more delta values. The computer program instructions also, when executed, cause the system to adjust a target time for each of the one or more broken circuit paths.

The computer program instructions also, when executed, cause the system to save metadata relating to each component contributing to the one or more circuit path. The computer program instructions also, when executed, cause the system to identify a critical path of the one or more circuit paths based on the collected data. The computer program instructions also, when executed, cause the system to identify one or more near critical paths of the one or more circuit paths using a machine learning operation, where a near critical path is a path having one or more features, characteristic, attributes, timing flow, or shared components with the critical path.

The computer program instructions also, when executed, cause the system to collect feedback of the one or more circuit paths based on the collected data and the adjusted target times for each of the one or more broken circuit paths. The computer program instructions also, when executed, cause the system to adjust one or more design parameters of the design model based on the collected feedback. The computer program instructions also, when executed, cause the system to predict a minimum voltage and timing sequences for each component contributing to the one or more circuit paths based on the collected data.

Yet another embodiment is directed to a computer program product for improving processor chip timing adjustment. The computer program product is disposed upon a computer readable medium and comprises computer program instructions that, when executed, cause a computer to collect data relating to one or more circuit paths during a design stage of a processor chip based on a design model. The computer program instructions also cause the computer to add one or more delta values to the one or more circuit paths of the design model. The computer program instructions also cause the computer to identify one or more broken circuit paths based on the one or more delta values. The computer program instructions also cause the computer to adjust a target time for each of the one or more broken circuit paths.

The computer program instructions also cause the computer to save metadata relating to each component contributing to the one or more circuit path. The computer program instructions also cause the computer to identify a critical path of the one or more circuit paths based on the collected data. The computer program instructions also cause the computer to identify one or more near critical paths of the one or more circuit paths using a machine learning operation, where a near critical path is a path having one or more features, characteristic, attributes, timing flow, or shared components with the critical path.

The computer program instructions also cause the computer to collect feedback of the one or more circuit paths based on the collected data and the adjusted target times for each of the one or more broken circuit paths. The computer program instructions also cause the computer to adjust one or more design parameters of the design model based on the collected feedback. The computer program instructions also cause the computer to predict a minimum voltage and timing sequences for each component contributing to the one or more circuit paths based on the collected data.

In general, as used herein, "enhance" or "improve" may refer to or be defined as "maximize," "minimize," "best," or attain one or more specific targets, objectives, goals, or intentions. Enhance or improve may also refer to maximizing a benefit to a user (e.g., maximize a trained machine learning pipeline/model benefit). Enhance or improve may also refer to making the most effective or functional use of a situation, opportunity, or resource.

Additionally, enhancing or improving need not refer to a best solution or result but may refer to a solution or result that "is good enough" for a particular application, for example. In some implementations, an objective is to suggest a "best" combination of identifying timing flow of a circuit path and adjusting one or more parameters or components of the critical path and/or design model, but there may be a variety of factors that may result in alternate suggestion of a combination of operations or adjustments. Herein, the terms "enhance" or "improve" may refer to such results based on minima (or maxima, depending on what parameters are considered in the optimization problem). In an additional aspect, the terms "enhancing" and "improving" may refer to an operation performed in order to achieve an improved result such as reduced execution costs or increased resource utilization, whether or not the optimum result is actually achieved. Similarly, the terms "enhance" or "improve" may refer to a component for performing such an improvement operation, and the term terms "enhance" may be used to describe the result of such an improvement or adjustment operation.

It is understood in advance that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the disclosure described herein. Regardless, cloud computing node 10 is capable of being implemented and performing any of the functionality set forth hereinabove.

In cloud computing node 10 there is a computer system/server 12, which is operational with numerous other general purpose or special purpose computing system environments or configurations. Examples of well-known computing systems, environments, and configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random-access memory ("RAM") 30 and cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the disclosure.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and methodologies of embodiments of the disclosure as described herein.

Computer system/server 12 may also communicate with one or more external devices 14 such as a keyboard, a pointing device, a display 24, etc.; one or more devices that enable a user to interact with computer system/server 12; and any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and a public network (e.g., the Internet) via network adapter 20. As depicted, network adapter 20 communicates with the other components of computer system/server 12 via bus 18. It should be understood that although not shown, other hardware and software components could be used in conjunction with computer system/server 12. Examples, include, but are not limited to: microcode, device drivers, redundant processing units, external disk drive arrays, RAID systems, tape drives, and data archival storage systems, etc.

Figure 2:
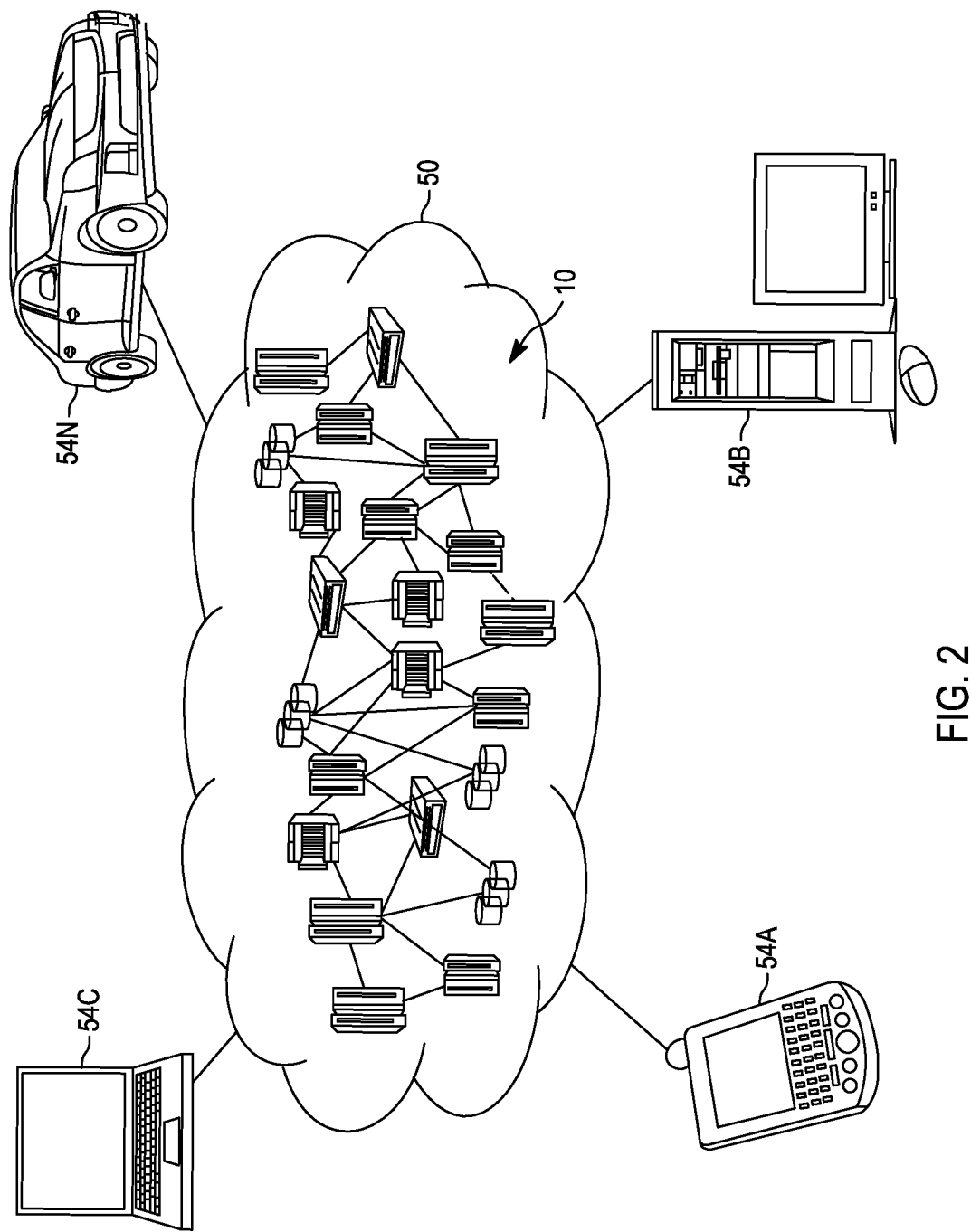
FIG. 2 depicts a cloud computing environment in accordance with some embodiments of the present disclosure.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and network addressable connection (e.g., using a web browser).

Figure 3:
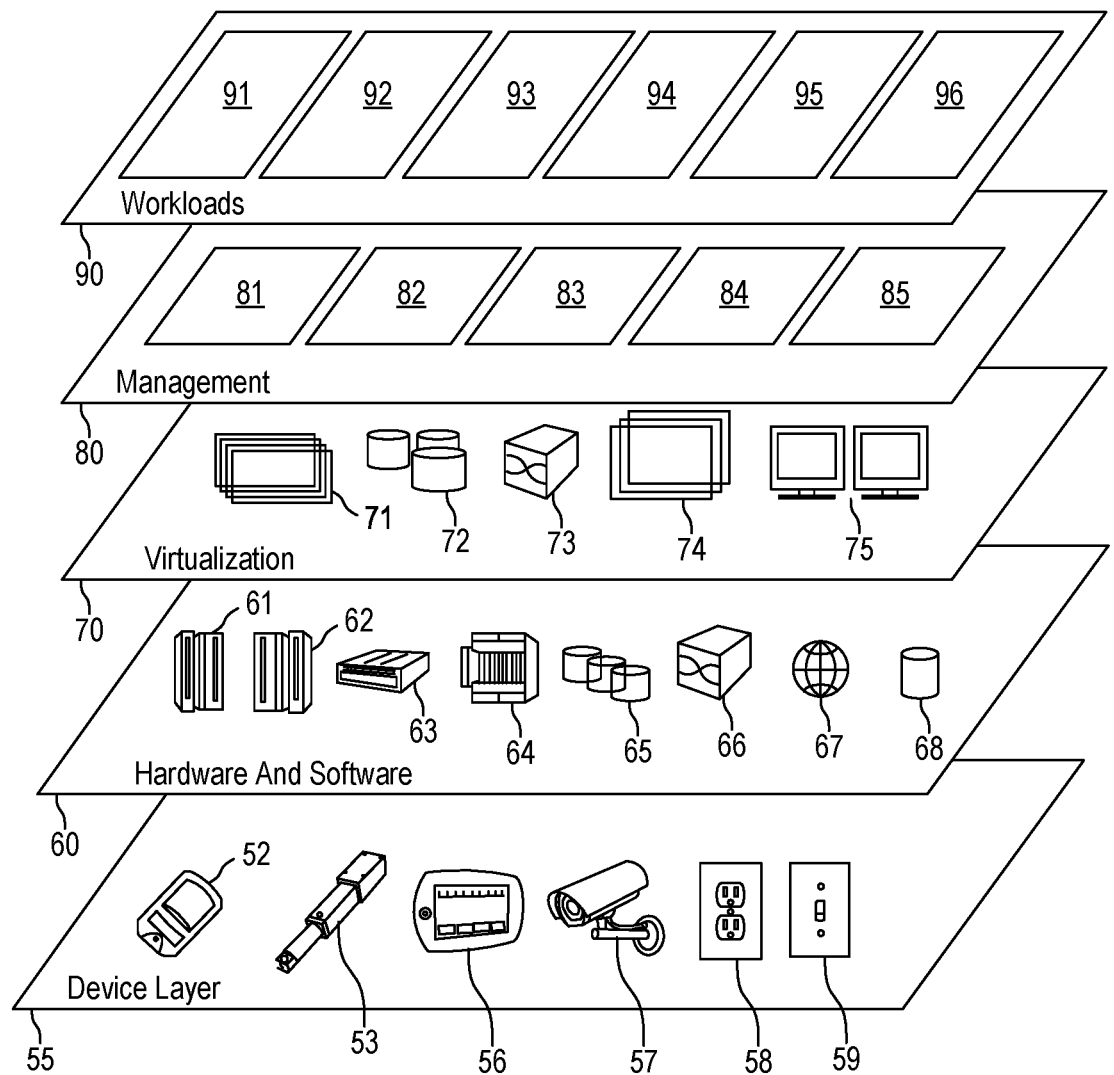
FIG. 3 depicts abstraction model layers in accordance with some embodiments of the present disclosure.

Referring now to FIG. 3, a set of functional abstraction layers provided by cloud computing environment 50 (FIG. 2) is shown. It should be understood that the components, layers, and functions shown in FIG. 3 are intended to be illustrative only and embodiments of the disclosure are not limited thereto. As depicted, the following layers and corresponding functions are provided:

Device layer 55 may include physical devices, virtual devices, or a combination of physical and virtual devices embedded with standalone electronics, sensors, actuators, and other objects to perform various tasks in a cloud computing environment 50. Each of the devices in the device layer 55 incorporates networking capability to other functional abstraction layers such that information obtained from the devices may be provided thereto, and information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to various additional sensor devices, networking devices, electronics devices (such as a remote-control device), additional actuator devices, so called "smart" appliances such as a refrigerator or washer/dryer, and a wide variety of other possible interconnected objects.

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present disclosure, various workloads and functions 96 for improving processor chip timing adjustment in a computing environment. In addition, workloads and functions 96 for improving processor chip timing adjustment may include such operations as analytics, metadata collect, and critical path identification, and as will be further described, user and device management functions. One of ordinary skill in the art will appreciate that the workloads and functions 96 for improving processor chip timing adjustment may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present disclosure.

As previously stated, various embodiments described herein provide novel solutions for improving processor chip timing adjustment. Data relating to one or more circuit paths may be collected during a design stage of a processor chip based on a design model. One or more delta values may be added to the one or more circuit paths of the design model. One or more broken circuit paths may be identified based on the one or more delta values. A target time for each of the one or more broken circuit paths may be adjusted.

Figure 4:
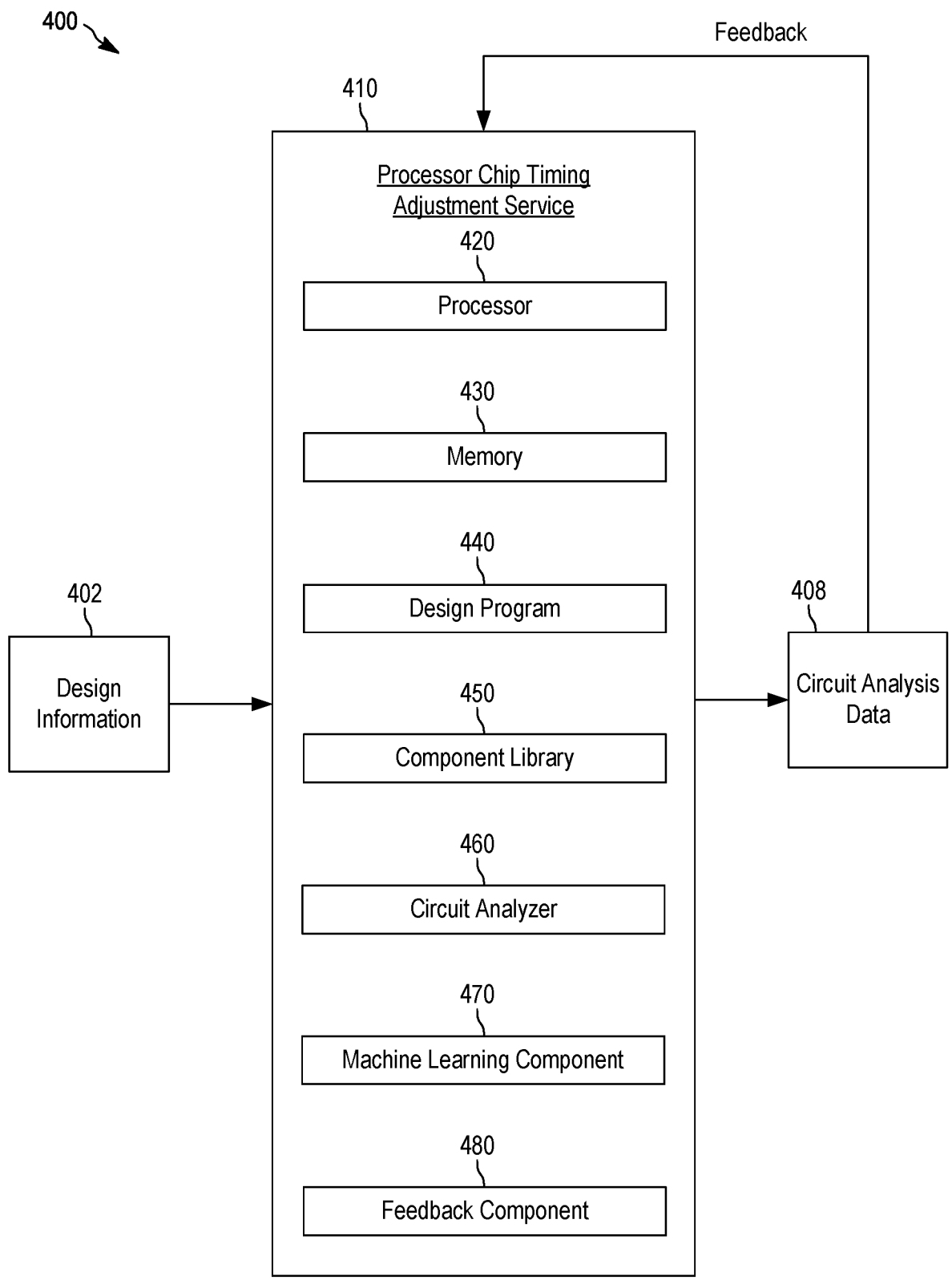
FIG. 4 is an additional block diagram depicting exemplary functional relationships between various aspects of the present disclosure in accordance with some embodiments of the present disclosure.

Turning now to FIG. 4, a block diagram depicting exemplary functional components of a system 400 for improving processor chip timing adjustment in an electronic design automation ("EDA") environment is shown. In one aspect, one or more of the components, modules, services, applications, and functions described in FIGS. 1-3 may be used in FIG. 4. As will be seen, many of the functional blocks may also be considered "modules" or "components" of functionality, in the same descriptive sense as has been previously described in FIGS. 1-3.

A processor chip timing adjustment service 410 is shown, incorporating processing unit 420 ("processor") to perform various computational, data processing and other functionality in accordance with various aspects of the present disclosure. In one aspect, the processor 420 and memory 430 may be internal and external to the processor chip timing adjustment service 410, and internal and external to the computing system/server 12 as described in FIG. 1. The processor chip timing adjustment service 410 may be included and external to the computer system/server 12, as described in FIG. 1. The processing unit 420 may be in communication with the memory 430. The processor chip timing adjustment service 410 may include a design program 440, a component library 450, a circuit analyzer component 460, a machine learning component 470, and a feedback component 480.

In one aspect, the system 400 may provide virtualized computing services (i.e., virtualized computing, virtualized storage, virtualized networking, etc.). More specifically, the system 400 may provide virtualized computing, virtualized storage, virtualized networking and other virtualized services that are executing on a hardware substrate.

In some embodiments, the processor chip timing adjustment service 410 can receive design information 402 such as a netlist of transistors and interconnections or any other suitable model corresponding to a design. The processor chip timing adjustment service 410 retrieves corresponding models from the component library 450 and executes a design using the circuit analyzer 460.

In some embodiments, the design information 402 can be a machine-readable description of a target processor chip (e.g., a circuit). The target processor chip can be a circuit related to a central processing unit (CPU), a graphic processor ("GPU") design, and accelerator processor unit ("APU") design, for example. In another example, the design information 402 (e.g., input data) can include a hardware description or circuit description. For example, parallel simulation can include Verilog and/or VHDL ("Very High Speed Integrated Circuit Hardware Description Language"). It is also noted that emerging hardware platforms can rely on accelerators to improve system performance and reduce power. Thus, it can be beneficial to develop hardware accelerators in high level languages (e.g., describing algorithms) such as SystemC/System Verilog/Bluespec, or another high-level synthesis (HLS). Further to describe circuits, Scala/chisel and/or other domain specific languages for circuit description can be utilized. Further, the various aspects can subsequently synthesize the hardware accelerators to FPGA or application-specific integrated circuit (ASIC) using Verilog/VHDL, for example.

In some embodiments, the design program 440 may design a hardware design. For example, the design program 440 can receive as the design information 402 related to a hardware design under consideration (e.g., a hardware design that is to be tested as discussed herein (e.g., a processor chip or target processor chip)). For example, the circuit data 114 can include details related to one or more latches and/or combination of logic that can be included in the hardware design. In some embodiments, a hardware design can include hundreds (or even thousands) of latches and/or logic combinations. Further, the hardware design can include multiple flow paths. Different flow paths of the multiple flow paths can include one or more of the latches and/or one or more of the combinations of logic.

In some embodiments, the design program 440 can be any automated chip design and analysis software, customized chip design software, or manual chip design software with a connection to component library 450. Design program 440 has the capability to perform all aspects of the design flow including, but not limited to, logic synthesis, placement, routing, analysis, and sign-off.

In some embodiments, the design program 440, in association with the component library 450, may be a collection of circuit design software tools that are partially or fully integrated into a single software package, or each tool may be separate software programs. In some embodiments, dual timing mode analysis tools of the design program 440, in association with the circuit analyzer 460, may search for both early-mode timing violations and late-mode timing violations. An early mode padding tool of design program 440 corrects early-mode timing violations, such as hold violations, by various methods including: resizing existing logic gates, swapping of functional latch output pins with respective scan pins, increasing threshold voltage of selected devices, and adding delay blocks to the incoming lines of logic circuits.

In some embodiments, the component library 450 may be a standard cell library, or customized cell library which includes, but is not limited to: a collection of low-level electronic logic functions such as AND, OR, INVERT, flip-flops, latches, and buffers. A standard cell is a group of transistors, resistors, and other interconnecting structures that provides a Boolean logic function or a storage function. The cell library may contain height, width, layout, power consumption, timing, and noise information for each cell. In an embodiment, a user may create customized cells for storage in component library 450. In some embodiments, the component library 450 may be fully integrated, partially integrated or separate from the design program 440.

In some embodiments, the circuit analyzer 460 may collect data relating to one or more circuit paths during a design stage of a processor chip based on a design model used by the design program 440. In some embodiments, the circuit analyzer 460 may save data such as, for example, metadata relating to each component (e.g., the components selected and used from the component library 450) contributing to the one or more circuit paths. In this way, the metadata may be saved rather than full chip timing to more quickly turn around timing and to react to hardware results and model updates.

In some embodiments, the circuit analyzer 460, which may also be used in conjunction with the machine learning component 470, may identify a critical path of the one or more circuit paths based on the collected data. Also, the circuit analyzer 460, which may also use the machine learning component 470, may identify one or more near critical paths of the one or more circuit paths using a machine learning operation, where a near critical path is a path having one or more features, characteristic, attributes, timing flow, or shared components with the critical path. In some embodiments, the circuit analyzer 460 may identify one or more broken circuit paths based on the one or more delta values.

In some embodiments, the circuit analyzer 460, which may also be used in conjunction with the machine learning component 470, may add one or more delta values to the one or more circuit paths of the design model. In some embodiments, the circuit analyzer 460, which may also be used in conjunction with the machine learning component 470, may adjust a target time for each of the one or more broken circuit paths.

In some embodiments, the circuit analyzer 460, which may also be used in conjunction with the machine learning component 470, may predict a minimum voltage ("Vmin") and timing sequence for each component contributing to the one or more circuit paths based on the collected data.

In some embodiments, the feedback component 480 may collect feedback of the one or more circuit paths based on the collected data and the adjusted target times for each of the one or more broken circuit paths.

In some embodiments, the processor chip timing adjustment service 410 may generate circuit analysis data 408 related to the one or more paths as output data or circuit analysis information. In some embodiments, the feedback component 480 can fed back to the processor chip timing adjustment service 410 the circuit analysis data 408 to be used together with the design information 402. For example, the design program 440 may adjust one or more design parameters of the design model based on the collected feedback such as, for example, the circuit analysis data 408.

It should be noted that, for each processor chip release (e.g., circuit design release), one or more design models may be updated and released to generate more accurate design models, which may be delivered after the original design model release. Also, there may be lot-to-lot, wafer-to-wafer, and chip-to-chip variations that can change the critical paths on each part. Thus, the adjusted, updated, and more accurate design models that are updated based on the delta values may be applied to the lot-to-lot, wafer-to-wafer, and chip-to-chip variations to predict critical paths. Also, in some embodiments, the circuit analyzer 460, which may also be used in conjunction with the machine learning component 470, may predict Vmin and alter one or more timing sequence/latches to improve the minimum voltage on each individual circuit component (e.g., various logic gates). Also, in some embodiments, the circuit analyzer 460, which may also be used in conjunction with the machine learning component 470, may be used to direct and instruct the sorting of the various design processor chips according to a selected attribute or characteristic such as, for example, low power packages compared to high power packages. Also, in some embodiments, the circuit analyzer 460, which may also be used in conjunction with the machine learning component 470, may adjust and tune wafer manufacturing to compensate future parameters of steps or operations the wafer to increase the accuracy of the chip design.

For further explanation, FIG. 5 sets forth a table 500 depicting processor chip timing adjustment enhancements in a computing system in a computing environment in accordance with some embodiments of the present disclosure. The table 500 illustrates, by way of example only, the functionality of the various components employed in FIG. 4. Thus, table 5 depicts the collected meta data relating to one or more circuit paths (e.g., paths 1-10 in table 500) during a design stage of a processor chip based on a design model. Delta values to the one or more circuit paths of the design model. One or more broken circuit paths based on the one or more delta values.

For example, table 500 depicts multiple various example circuit paths. It should be noted that the number of circuit paths (e.g., 10 circuit paths) are used herein for illustrative purposes only and an integrated circuit may have many circuit paths (e.g., millions of circuit paths). The rows of table 500 depict, for example, ten circuit paths. The columns of the table 500 depict, for example, a variety of components that may be used in a circuit path such as, for example, type one ("1") logic gate, type two ("2") logic gate, and type "3" logic gate, and resistance capacity ("RC") of a wire such as, for example, a first metal ("M1"), and a RC of an alternative wire such as, for example, a second metal ("M2") RC.

In one aspect, the first column indicates the path number, and the second column represents the timing. For example, the various types of logic gates in the columns may be a high ("H") (which may be represented as the type 3), regular ("R") (which may be represented as type 1 in table 500), or low (L) threshold voltage (Vt) of a Pfet ("P") or of an Nfet transistor (which may be represented as type 2 in table 500). For example, the type 1 logic gate of the third column may be a RVt P transistor. Thus, each of the logic gates may be categorized according to one or more characteristics or attributes of the logic gate.

More specifically, table 500 depicts in the second column the timing sign off for each circuit path (e.g., timing path). For example, the rows for the circuit paths 1-10, represent closing the timing sign off in the first circuit path as 117 picoseconds ("ps"), closing the timing sign off in the second circuit path as 110, closing the timing sign off in the third circuit path as 110 ps, closing the timing sign off in the fourth circuit path as 120 ps, closing the timing sign off in the fifth circuit path as 120 ps, closing the timing sign off in the sixth circuit path as 104 ps, closing the timing sign off in the seventh circuit path as 108 ps, closing the timing sign off in the eighth circuit path as 95 ps, closing the timing sign off in the ninth circuit path as 122 ps, and closing the timing sign off in the tenth circuit path as 115 ps.

Also, the data collected and analyzed in the table 500 may depict a percentage value in a row of a column for the various types of logic gate. For example, in the third column of the row for the circuit path 1, having the timing sign off of 117 ps, depicts a 35% value, which represents a percentage of the delay attributed with that particular type of logic gate (e.g., type 1 logic gate).

As depicted, the critical path is observed to be in path 9 based on closing the timing sign off in the ninth circuit path as 122 ps. In some embodiments, timing goals may be set for each of the paths and assuming there is a timing goal of 122 ps, the critical path reaches the timing goals precisely at 122 ps. Slack, which is the difference between the timing goal and the actual timing sign off, can be observed in the other paths. For example, there would be 28 ps of slack in the eight-path having a timing sign off of 94 ps.

Thus, by collecting the metadata, the circuit design may be analyzed and processed. Based on the collected metadata one or more broken paths (e.g., paths that are performing less than optimal or not as expected) may be identified. For example, if one of the device types has a timing signoff less than expected (e.g., performs 10% slower than expected), one or more alternative paths may also be negatively impacted. For example, if one of the logic gate types perform less than expected such as, for example, the type 1 logic gate in column 3, the circuit path 1, having the timing sign off of 117 ps, may now become the critical path based on a longer timing sign off (e.g., 135 ps), while the previous critical path (e.g., circuit path 9) may become faster such as, for example, going from 122 ps to 100 ps.

Moreover, the data may be analyzed to identified "near critical paths." That is, those circuit paths that may share and/or have one or more features, characteristics, attributes, timing flow, or shared components with the critical path. By way of example only, circuit paths 6 and 7 may be near critical paths since that may share and/or have one or more features, characteristic, attributes, timing flow, or shared components with the circuit path 9. For example, in some embodiments, the circuit analyzer 460, which may also be used in conjunction with the machine learning component 470 of FIG. 4, may identify critical paths on a manufactured hardware and use machine learning to identify and find the "near critical paths" that cluster near to the critical paths such as, for example, if the critical path 7 is identified as a critical path in hardware, the machine learning would predict path 6 being near critical too as it shares so much in common with it and circuit path 6 and 7 may both be improved by adjusting the design model.

Table 500 also depicts the added delta values to an original design model which represents a "change" or a "percentage of change" to the timing flow or timing sign off based on the selected or used component types (e.g., the various logic gate types) in the design model. For example, each of the logic gate type in the columns may have similar or different delta values. The delta values may be used to adjust the design model or be used to select different logic gate types for the various circuit paths. Thus, the delta values, represented here in Table 500 by way of illustration, the adjustments to the original or subsequent design models may select or adjust the hard device types used to attempt to reduce the delta value for the circuit paths or the logic gate types back to a zero ("0") or defined value or percentage.

Also, the shaded areas in the "most affected" columns may represent, by way of example, only, those circuit paths that are most affected by the circuit model design. That is, those "most affected" circuit paths may be circuit paths having a timing sign off that is less than anticipated or greater than anticipated. Also, the shaded areas in the row depicting the "deltas to the model" depict those hardware types (e.g., logic gate types and metal layers) that are less than anticipated or greater than anticipated. For example, the type 2 logic gate in column 7 has a negative (−) five percent delta value (e.g., requires less time and faster), which represents the type 2 logic gate is 5% faster than anticipated in the processor chip design. It should be noted, by way of example only, reference to a negative ("−") value indicates less time required than a goal or anticipated time (e.g., −2% indicating 2% faster than anticipated) and positive ("+") values indicates more time required than a goal or anticipated time (e.g., +10%). For example, M2 RC, on path 9 (e.g., column 9), the timing is 122 picoseconds and path 9 took 40% of that time. Thus, the overall timing is 122+(40%*122*10% more time), which equals 127, which is 5 picoseconds longer than anticipated.

Thus, the delta values may be used to determine a new timing for each circuit path. The circuit path data may be collected for each path during the design, the delta values may be added to the original circuit design model, broken circuit paths may be identified, and then the design model may be adjusted, one or more or more new design models may be created, and/or a target time may be adjusted for each of the one or more broken circuit paths in the design model.

Figure 6:
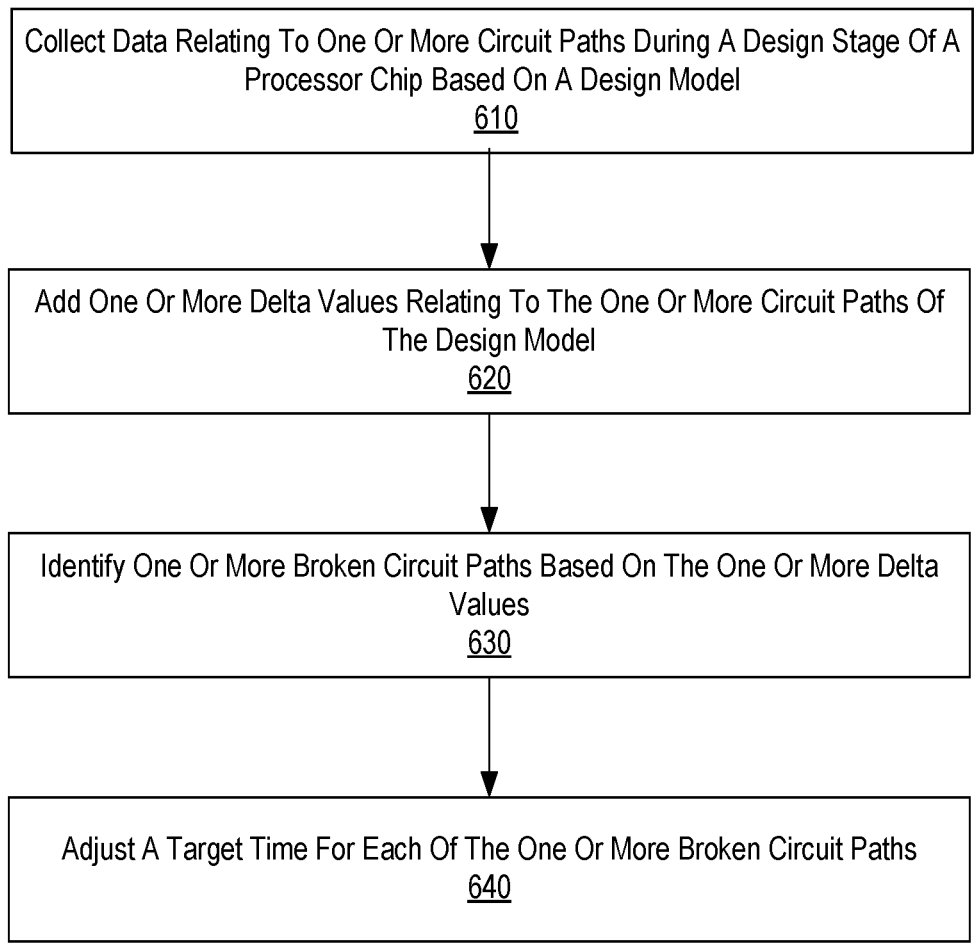
FIG. 6 sets forth a flow chart illustrating an example method of improving processor chip timing adjustment in accordance with some embodiments of the present disclosure.

For further explanation, FIG. 6 sets forth a flow chart illustrating an example method of improving processor chip timing adjustment in accordance with some embodiments of the present disclosure. The example method of FIG. 6 includes collecting 610 data relating to one or more circuit paths during a design stage of a processor chip based on a design model. In some implementations, the data can be physical layout data. In other implementations, the data can be other types of data that is defined or targeted. For example, the circuit analyzer 460 may collect metadata relating to each circuit path of a design circuit generated by the design program 440 based on the design information 402.

The example method of FIG. 6 also includes adding 620 one or more delta values to the one or more circuit paths of the design model. For example, the circuit analyzer 460, in association with the machine learning component 470, may determine any variations between the actual timing sign off and a target time sign off of each of the circuit paths of a design circuit generated by the design program 440 based on the design information 402. Any detected difference (positive or negative) may set as a delta value (e.g., a percentage) of the difference between the actual timing flow and the target/goal timing flow of the circuit path. These delta values may be placed in a table such as, for example, table 500 of FIG. 5.

The example method of FIG. 6 also includes identifying 630 one or more broken circuit paths based on the one or more delta values. The example method of FIG. 6 also includes adjusting 640 a target time for each of the one or more broken circuit paths. For example, the circuit analyzer 460, in association with the machine learning component 470, may identify each broken circuit path (e.g., those circuit paths that are not within a defined range of the target timing sign off goal) and the delta values (e.g., negative delta values) may be assigned to indicate a percentage or a degree of error between the timing flow sign off and the timing flow/sign off goal for each circuit component.

Figure 7:
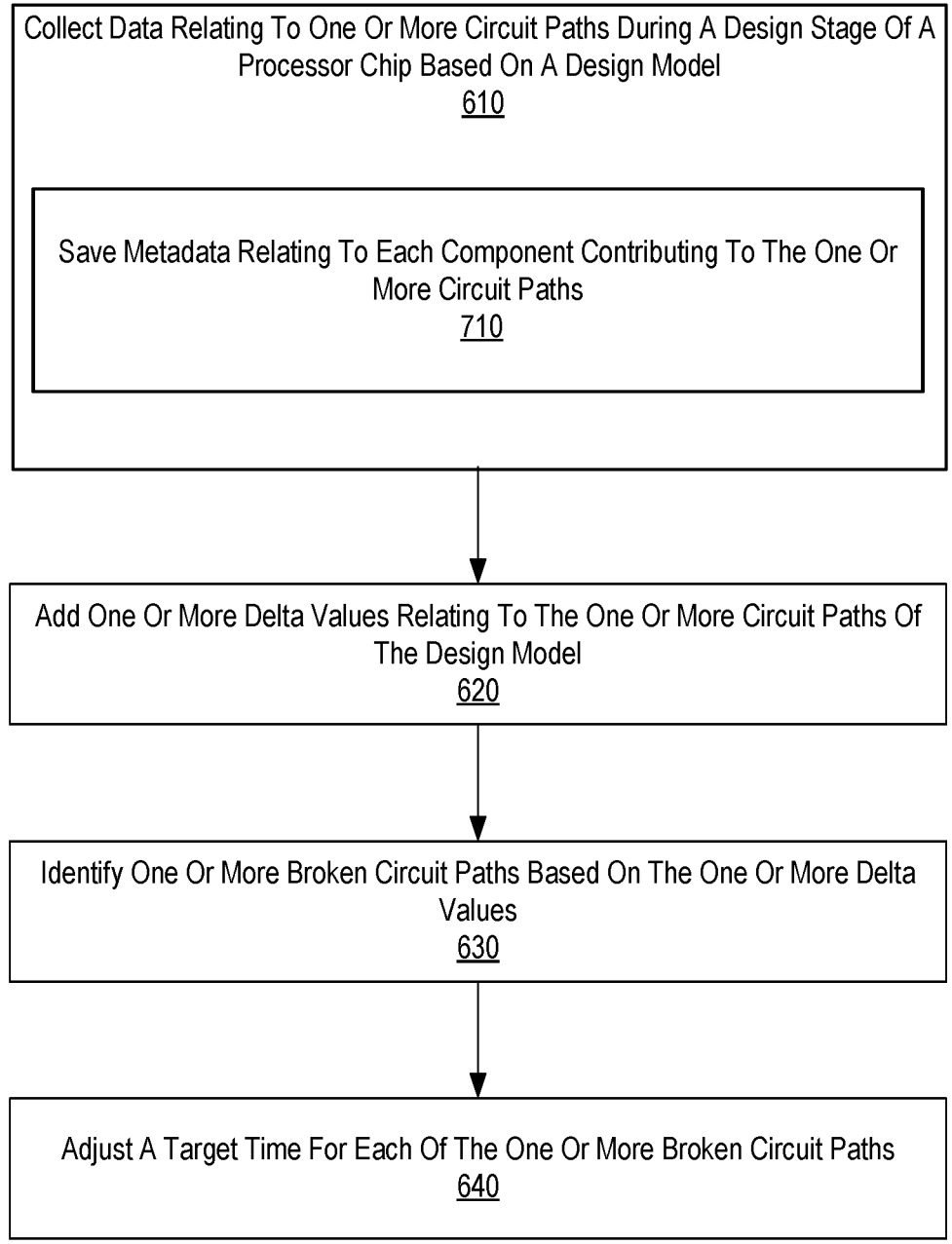
FIG. 7 sets forth a flow chart illustrating an example method of improving processor chip timing adjustment in accordance with some embodiments of the present disclosure.

For further explanation, FIG. 7 sets forth a flow chart illustrating an additional example method of improving processor chip timing adjustment in accordance with some embodiments of the present disclosure. Like the example method of FIG. 6, the example method of FIG. 7 includes collecting 610 data relating to one or more circuit paths during a design stage of a processor chip based on a design model; adding 620 one or more delta values to the one or more circuit paths of the design model; identifying 630 one or more broken circuit paths based on the one or more delta values; and adjusting 640 a target time for each of the one or more broken circuit paths.

The example method of FIG. 7 also includes saving 710 metadata relating to each component contributing to the one or more circuit paths. For example, the circuit analyzer 460, in association with the machine learning component 470, may collect, gather, and save the metadata in the design program 440 and the component library 450, to be used for subsequent analysis and adjustments to the design model.

Figure 8:
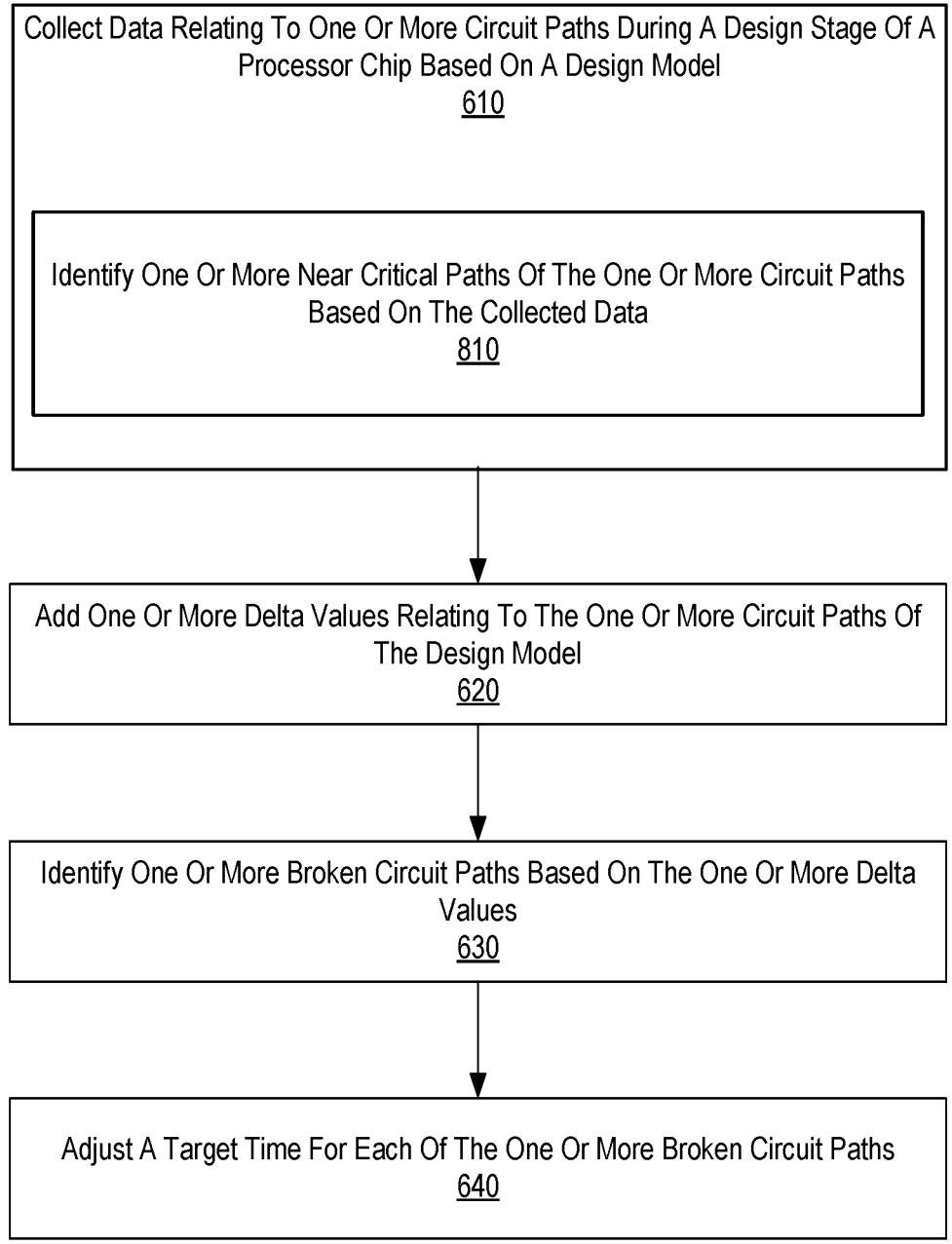
FIG. 8 sets forth a flow chart illustrating another example method of improving processor chip timing adjustment in accordance with some embodiments of the present disclosure.

For further explanation, FIG. 8 sets forth a flow chart illustrating an example method of improving processor chip timing adjustment in accordance with some embodiments of the present disclosure. Like the example method of FIG. 6, the example method of FIG. 8 also includes collecting 610 data relating to one or more circuit paths during a design stage of a processor chip based on a design model; adding 620 one or more delta values to the one or more circuit paths of the design model; identifying 630 one or more broken circuit paths based on the one or more delta values; and adjusting 640 a target time for each of the one or more broken circuit paths.

The example method of FIG. 8 also includes identifying 810 a critical path of the one or more circuit paths based on the collected data. For example, the circuit analyzer 460, in association with the machine learning component 470, may identify the critical path based on the collected data relating to the circuit design generated by the design program 440 based on the design information.

Figure 9:
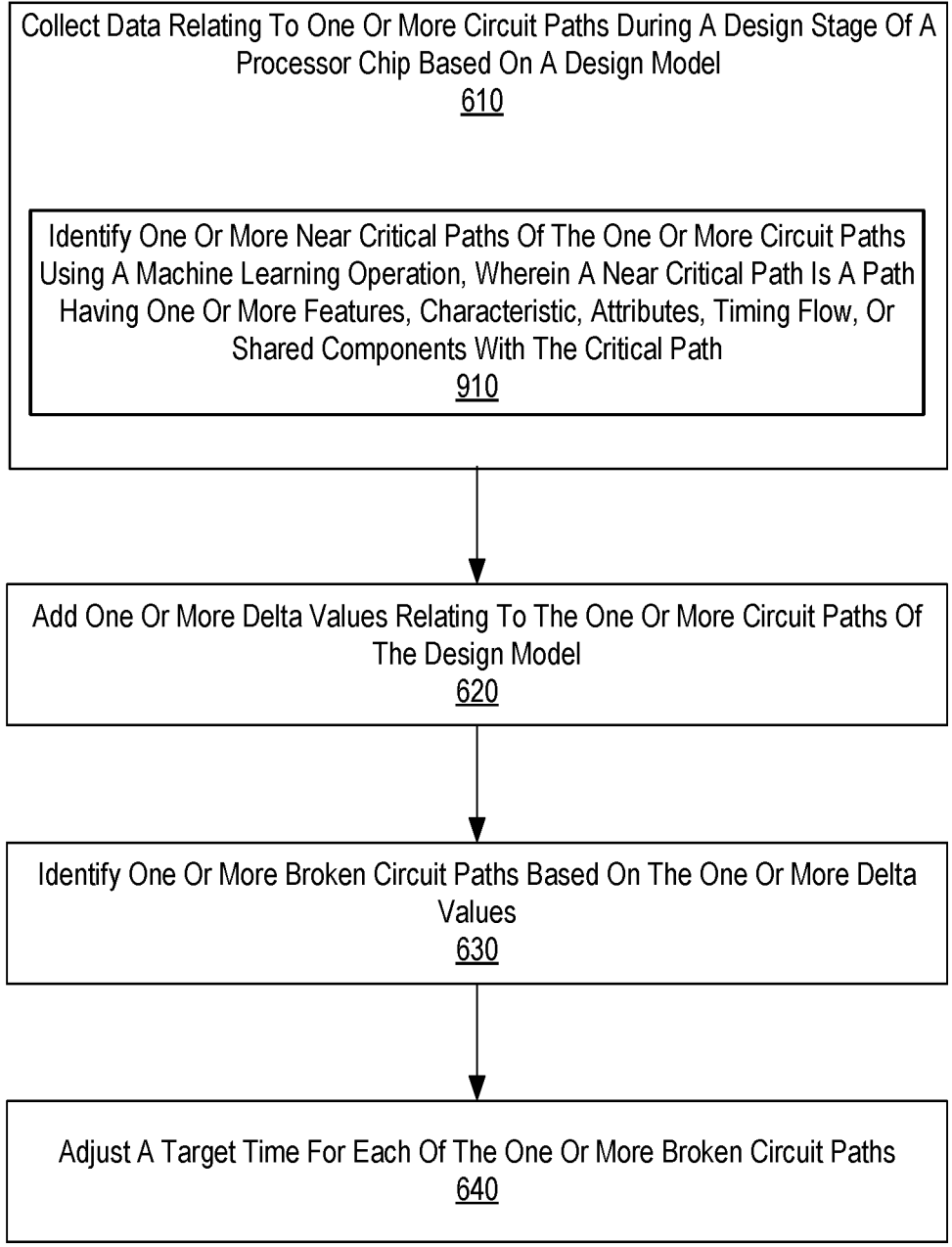
FIG. 9 sets forth a flow chart illustrating another example method of improving processor chip timing adjustment in accordance with some embodiments of the present disclosure.

For further explanation, FIG. 9 sets forth a flow chart illustrating an example method of improving processor chip timing adjustment in accordance with some embodiments of the present disclosure. Like the example method of FIG. 6, the example method of FIG. 8 also includes collecting 610 data relating to one or more circuit paths during a design stage of a processor chip based on a design model; adding 620 one or more delta values to the one or more circuit paths of the design model; identifying 630 one or more broken circuit paths based on the one or more delta values; and adjusting 640 a target time for each of the one or more broken circuit paths.

The example method of FIG. 9 also includes identifying 910 one or more near critical paths of the one or more circuit paths using a machine learning operation, wherein a near critical path is a path having one or more features, characteristic, attributes, timing flow, or shared components with the critical path. For example, the circuit analyzer 460, in association with the machine learning component 470, may identify and find the "near critical paths" that cluster near to the critical paths such as, for example, if a critical path 7 from table 500 is identified as a critical path in a hardware device/processor chip, the machine learning component 470 may predict path 6 being at or "near critical" too as it shares so much in common with it and circuit path 6 and 7 may both be improved by adjusting the design model.

Figure 10:
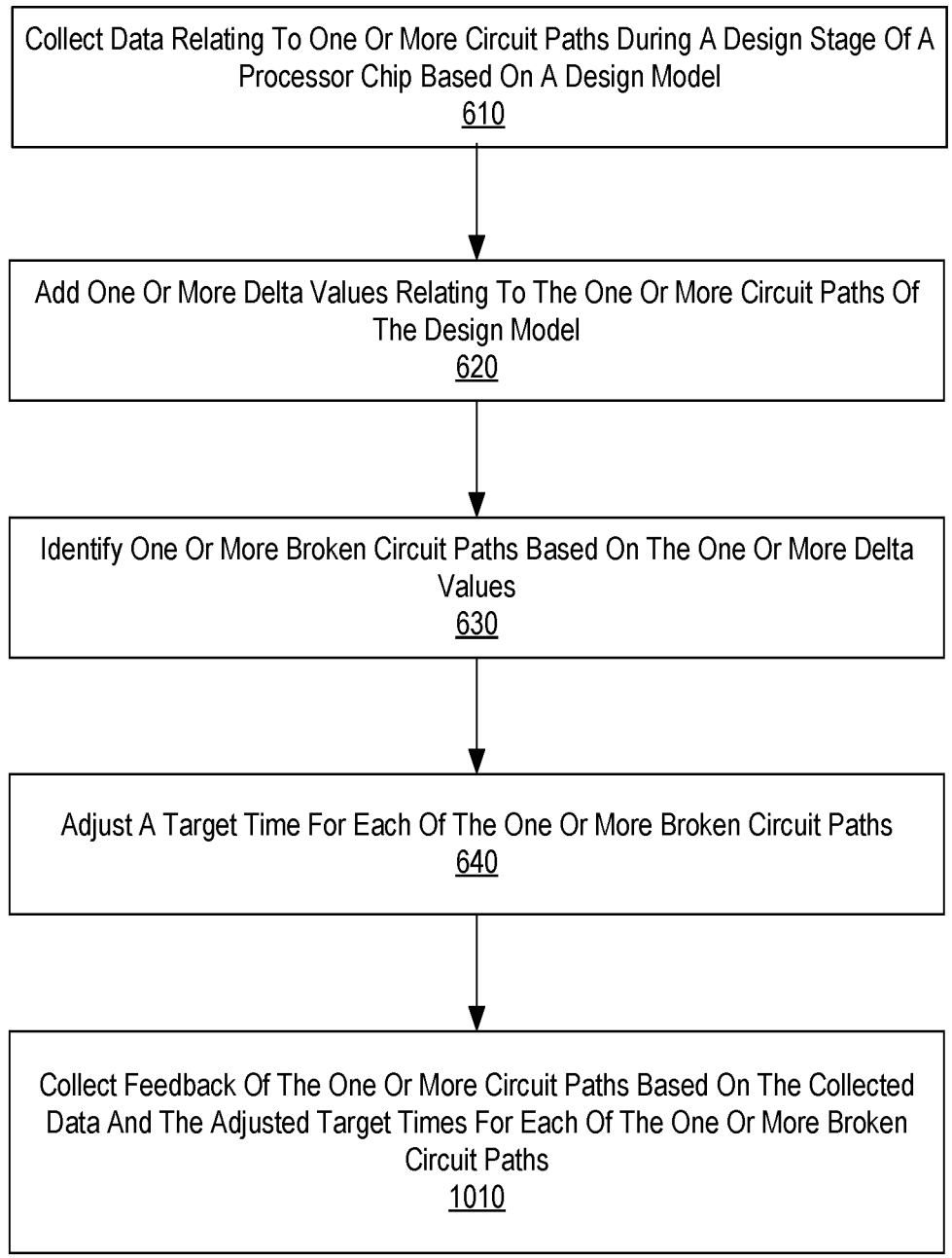
FIG. 10 sets forth a flow chart illustrating another example method of improving processor chip timing adjustment in accordance with some embodiments of the present disclosure.

For further explanation, FIG. 10 sets forth a flow chart illustrating an example method of improving processor chip timing adjustment in accordance with some embodiments of the present disclosure. Like the example method of FIG. 6, the example method of FIG. 10 also includes collecting 610 data relating to one or more circuit paths during a design stage of a processor chip based on a design model; adding 620 one or more delta values to the one or more circuit paths of the design model; identifying 630 one or more broken circuit paths based on the one or more delta values; and adjusting 640 a target time for each of the one or more broken circuit paths.

The example method of FIG. 10 also includes collecting 1010 feedback of the one or more circuit paths based on the collected data and the adjusted target times for each of the one or more broken circuit paths. For example, the feedback component 480 of FIG. 4 may collect the feedback data such as, for example, feeding back the circuit analysis data 408 to the processor chip timing adjustment service. The circuit analysis data 408 may include the collected data and the adjusted target times.

Figure 11:
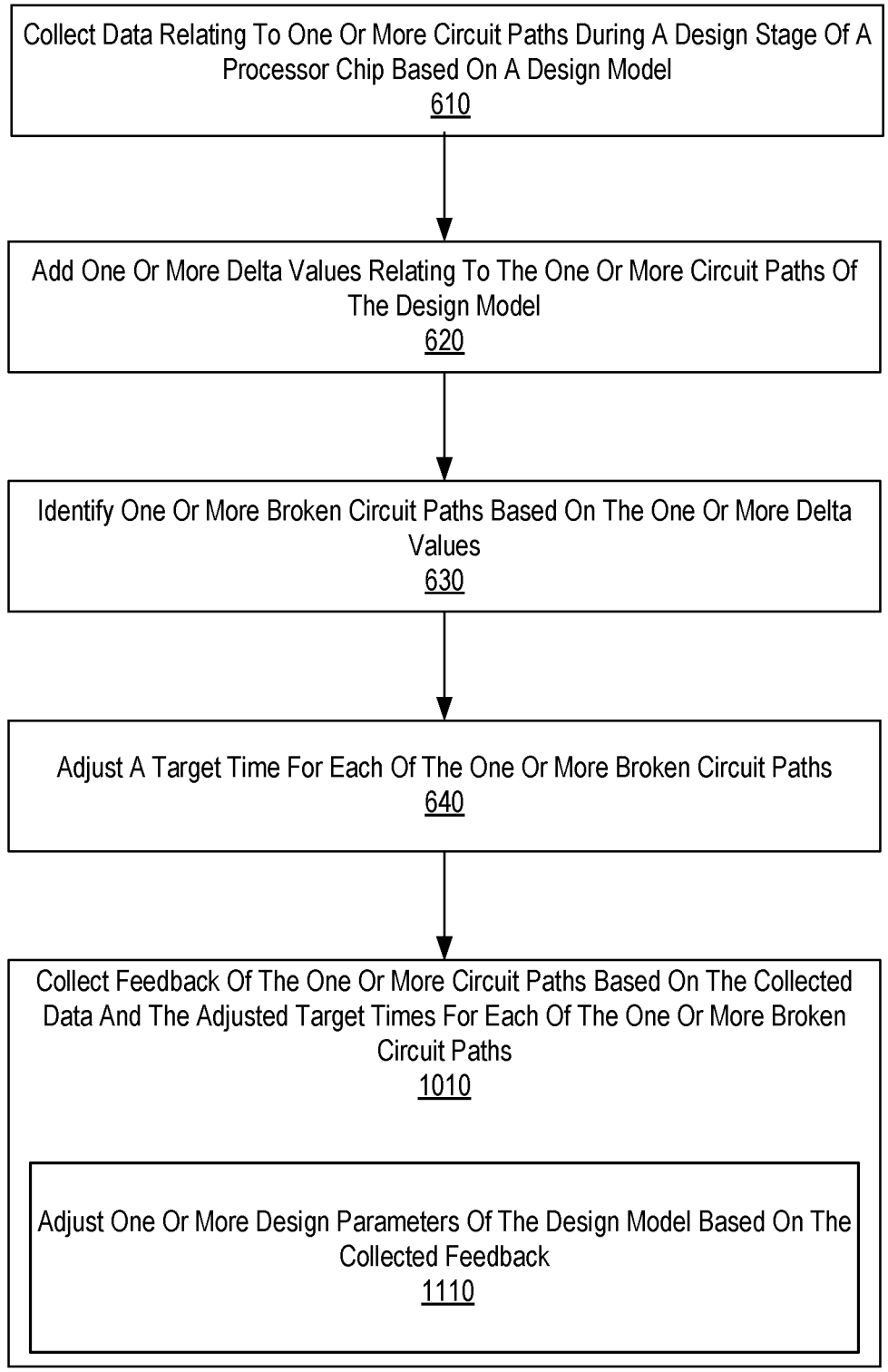
FIG. 11 sets forth a flow chart illustrating another example method of improving processor chip timing adjustment in accordance with some embodiments of the present disclosure.

For further explanation, FIG. 11 sets forth a flow chart illustrating an example method of improving processor chip timing adjustment in accordance with some embodiments of the present disclosure. Like the example method of FIG. 6, the example method of FIG. 11 also includes collecting 610 data relating to one or more circuit paths during a design stage of a processor chip based on a design model; adding 620 one or more delta values to the one or more circuit paths of the design model; identifying 630 one or more broken circuit paths based on the one or more delta values; and adjusting 640 a target time for each of the one or more broken circuit paths.

The example method of FIG. 11 also includes adjusting 1110 one or more design parameters of the design model based on the collected feedback such as, for example, measurements from the finished chip or measurements collected during wafer manufacturing. For example, the circuit analyzer 460, in association with the machine learning component 470, may use the delta values that are assigned based on the collected metadata and adjust one or more design parameters of one or more design models. In some embodiments, the circuit analyzer 460, in association with the machine learning component 470, may adjust, update, and provide a more accurate design model based on the delta values and be applied to the lot-to-lot, wafer-to-wafer, and chip-to-chip variations to predict critical paths. Also, in some embodiments, the circuit analyzer 460, in association with the machine learning component 470, may adjust and tune wafer manufacturing to compensate future parameters of steps or operations the wafer to increase the accuracy of the chip design.

Figure 12:
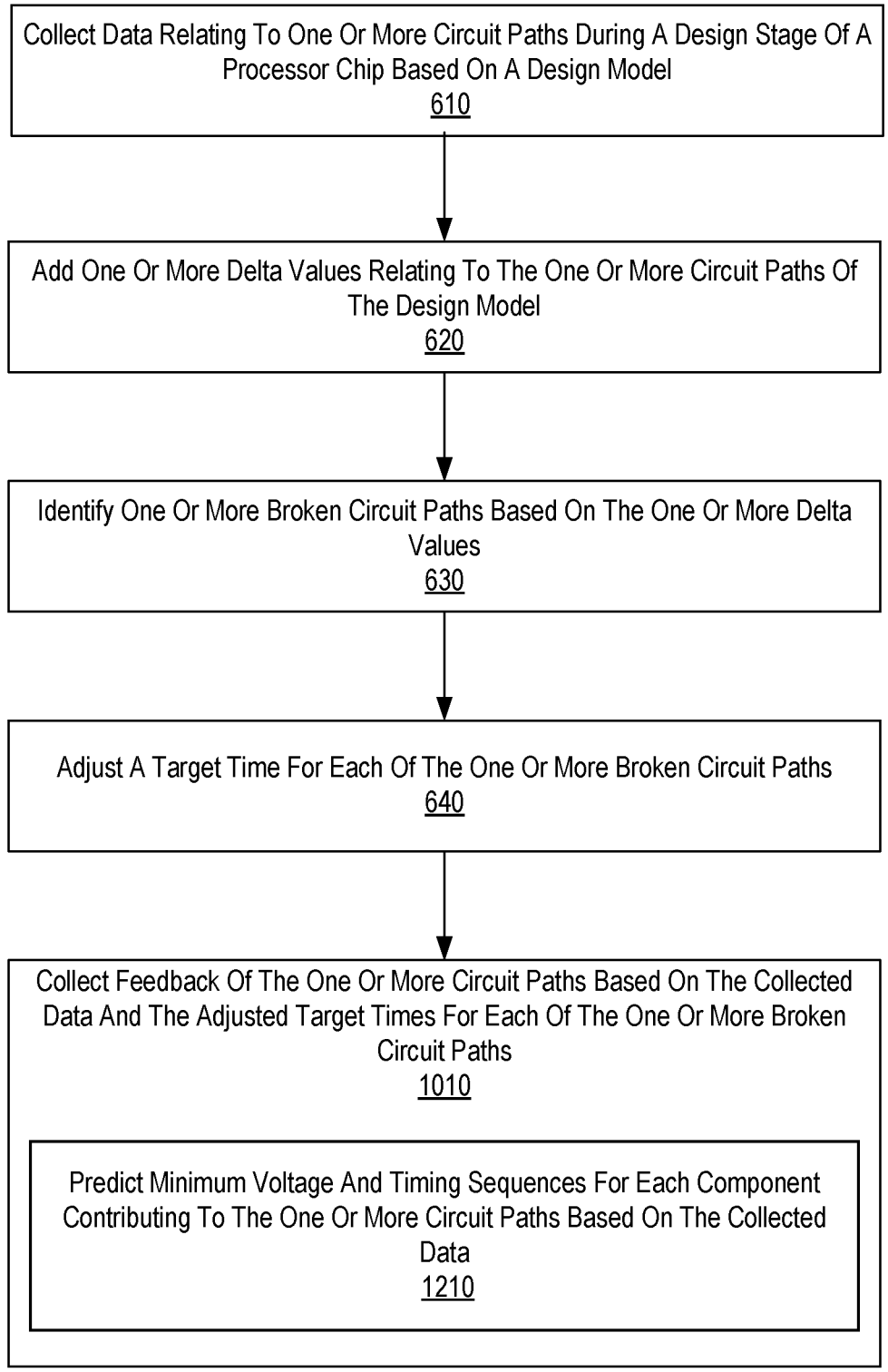
FIG. 12 sets forth a flow chart illustrating another example method of improving processor chip timing adjustment in accordance with some embodiments of the present disclosure.

For further explanation, FIG. 12 sets forth a flow chart illustrating an example method of improving processor chip timing adjustment in accordance with some embodiments of the present disclosure. Like the example method of FIG. 6, the example method of FIG. 12 also includes collecting 610 data relating to one or more circuit paths during a design stage of a processor chip based on a design model; adding 620 one or more delta values to the one or more circuit paths of the design model; identifying 630 one or more broken circuit paths based on the one or more delta values; and adjusting 640 a target time for each of the one or more broken circuit paths.

The example method of FIG. 12 also includes predicting 1210 a minimum voltage and timing sequences for each component contributing to the one or more circuit paths based on the collected data. For example, in some embodiments, the circuit analyzer 460, in association with the machine learning component 470, may predict Vmin and alter one or more timing sequence/latches to improve the minimum voltage on each individual circuit component (e.g., various logic gates). In some implementations, predicting the timing sequences for each component contributing to the one or more circuit paths based on the collected data includes predicting, testing, and adjusting the timing sequences using the timing bits/cycle stealing for a chip. In some implementations, for using timing bits, a critical path is identified. More time can be provided to the critical path by changing the timing bits that control local clocks that launch the critical path data to launch earlier from a latch of the critical path and/or change the timing bits that control the local clocks that receive the data into a capture latch of the critical path.

The timing controls are programmed by scanning these control bits ahead of functional operation and they are kept at a fixed state. These control bits cause the local clocks to transition earlier, or later, depending upon the state of the control bits. The drawback is that a margin in the path upstream of the launching latch is reduced and/or the margin in the path downstream from the capture latch is reduced. That is, cycle stealing may be used. That is, since there is margin in the path upstream or downstream, cycle stealing may be used by stealing from it (e.g., stealing the excess margin of time) to give more margin in the critical path that has zero or negative margin. Cycle "stealing" is where there is a portion of time available for solving the logic in one circuit, which does not have a critical timing problem, and using this "stolen" portion of time to solve logic in second circuit. In brief, cycle stealing involves skewing or time shifting associated arrival times of clocks feeding respective latches.

Thus, these timing sequences are adjusted based on a number of factors such as, for example, using hardware testing to measure and identify the critical path, or make adjustments to the timing sequences and then re-measure the minimum voltage at a given frequency to check improvement. The critical paths can be predicted using metadata from the timing runs prior to measuring on hardware. In other implementations, critical paths can be predicted using metadata along with actual hardware measured parameters such as, for example, the threshold voltages and wire resistance and capacitance. These timing sequence adjustments could be made the same across all of the shipped hardware but can potentially be granular enough that each chip can have timing control bits for the chip, which may be customized.

The present disclosure may be a system, a method, or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and a wireless network. The network may comprise copper transmission cables, optical transmission fibers, wireless transmission, routers, firewalls, switches, gateway computers and edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and block diagrams of methods, apparatus (systems), and computer program products according to embodiments of the disclosure. It will be understood that each block of the flowchart illustrations and block diagrams, and combinations of blocks in the flowchart illustrations and block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowcharts and block diagram block or blocks. These computer readable program instructions may also be stored in a computer readable storage medium that can direct a computer, a programmable data processing apparatus, and other devices to function in a particular manner, such that the computer readable storage medium having instructions stored therein comprises an article of manufacture including instructions which implement aspects of the function/act specified in the flowcharts and block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and block diagram block or blocks.

The flowcharts and block diagrams in the Figures illustrate the architecture, functionality, and operation of possible implementations of systems, methods, and computer program products according to various embodiments of the present disclosure. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and flowchart illustrations, and combinations of blocks in the block diagrams and flowchart illustrations, can be implemented by special purpose hardware-based systems that perform the specified functions or acts or carry out combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method for improving processor chip timing adjustment in a computing environment, the method comprising:
    collecting data relating to one or more components in one or more circuit paths during a design stage of a processor chip based on a design model, wherein each of the one or more components contributes to a time slack comprising a delta value;
    adding one or more delta values to the one or more circuit paths of the design model, wherein each added delta value corresponds to collected data relating to the one or more components in the one or more circuit paths;

responsive to adding the one or more delta values to the one or more circuit paths, identifying one or more broken circuit paths; and adjusting a target time for each of the one or more broken circuit paths.

2. The method of claim 1, wherein collecting the data relating to the one or more circuit paths further includes saving metadata relating to each component contributing to the one or more circuit paths.

3. The method of claim 1, wherein collecting the data relating to the one or more circuit paths further includes identifying a critical path of the one or more circuit paths based on the collected data.

4. The method of claim 3, wherein collecting the data relating to the one or more circuit paths further includes identifying one or more near critical paths of the one or more circuit paths using a machine learning operation, wherein a near critical path is a path having one or more features, characteristic, attributes, timing flow, or shared components with the critical path.

5. The method of claim 1, further including collecting feedback of the one or more circuit paths based on the collected data and the adjusted target times for each of the one or more broken circuit paths.

6. The method of claim 5, further including adjusting one or more design parameters of the design model based on the collected feedback.

7. The method of claim 1, further including predicting a minimum voltage and timing sequences for each component contributing to the one or more circuit paths based on the collected data.

8. A system for improving processor chip timing adjustment in a computing environment, comprising one or more computers with executable instructions that when executing cause the system to:

collect data relating to one or more components in one or more circuit paths during a design stage of a processor chip based on a design model, wherein each of the one or more components contributes to a time slack comprising a delta value;

add one or more delta values to the one or more circuit paths of the design model, wherein each added delta value corresponds to collected data relating to one or more components in one or more circuit paths;

responsive to the one or more added delta values to the one or more circuit paths, identify one or more broken circuit paths; and adjust a target time for each of the one or more broken circuit paths.

9. The system of claim 8, wherein the executable instructions that when executed cause the system to save metadata relating to each component contributing to the one or more circuit paths.

10. The system of claim 8, wherein the executable instructions that when executed cause the system to identify a critical path of the one or more circuit paths based on the collected data.

11. The system of claim 8, wherein the executable instructions that when executed cause the system to identify one or more near critical paths of the one or more circuit paths using a machine learning operation, wherein a near critical path is a path having one or more features, characteristic, attributes, timing flow, or shared components with the critical path.

12. The system of claim 8, wherein the executable instructions that when executed cause the system to collect feedback of the one or more circuit paths based on the collected data and the adjusted target times for each of the one or more broken circuit paths.

13. The system of claim 12, wherein the executable instructions that when executed cause the system to adjust one or more design parameters of the design model based on the collected feedback.

14. The system of claim 8, wherein the executable instructions that when executed cause the system to predict a minimum voltage and timing sequences for each component contributing to the one or more circuit paths based on the collected data.

15. A computer program product for improving processor chip timing adjustment in a computing environment, the computer program product comprising one or more computer readable storage media, and program instructions collectively stored on the one or more computer readable storage media, the program instruction comprising:

program instructions to collect data relating to one or more components in one or more circuit paths during a design stage of a processor chip based on a design model, wherein each of the one or more components contributes to a time slack comprising a delta value;

program instructions to add one or more delta values to the one or more circuit paths of the design model, wherein each added delta value corresponds to collected data relating to one or more components in one or more circuit paths;

program instructions, responsive to the one or more added delta values to the one or more circuit paths, to identify one or more broken circuit paths; and program instructions to adjust a target time for each of the one or more broken circuit paths.

16. The computer program product of claim 15, further including program instructions to save metadata relating to each component contributing to the one or more circuit paths.

17. The computer program product of claim 15, further including program instructions to:

identify a critical path of the one or more circuit paths based on the collected data; and identify one or more near critical paths of the one or more circuit paths using a machine learning operation, wherein a near critical path is a path having one or more features, characteristic, attributes, timing flow, or shared components with the critical path.

18. The computer program product of claim 15, further including program instructions to collect feedback of the one or more circuit paths based on the collected data and the adjusted target times for each of the one or more broken circuit paths.

19. The computer program product of claim 18, further including program instructions to adjust one or more design parameters of the design model based on the collected feedback.

20. The computer program product of claim 15, further including program instructions to predict a minimum voltage and timing sequences for each component contributing to the one or more circuit paths based on the collected data.

* * * * *